(12) United States Patent
Cheng (10) Patent No.: US 8,898,915 B2
(45) Date of Patent: Dec. 2, 2014

(54) TWIN-BEAM LASER MODULE FOR USE WITH A LASER SIGHT

(75) Inventor: Daniel Cheng, Sijhih (TW)

(73) Assignee: Quarton, Inc (TW)

( * ) Notice: Subject to any disclaimer, the term of this patent is extended or adjusted under 35 U.S.C. 154(b) by 301 days.

(21) Appl. No.: 13/445,038

(22) Filed: Apr. 12, 2012

(65) Prior Publication Data

US 2013/0182739 A1   Jul. 18, 2013

(51) Int. Cl.
*G01C 15/00* (2006.01)

(52) U.S. Cl.
CPC .......... *G01C 15/004* (2013.01); *G01C 15/002* (2013.01); *Y10S 33/21* (2013.01)
USPC ...................................... 33/286; 33/DIG. 21

(58) Field of Classification Search
CPC ...... G01B 11/27; G01B 11/272; G01B 11/24; G01B 11/26; G01B 11/2755; G01B 11/03; G01B 11/275; G01B 2210/283; G01B 5/0025; G01B 2210/30; G01B 5/008; G01B 11/002; G01B 11/306; G01B 2210/16; G01B 2210/22; G01B 11/007

USPC ............................................. 33/286, DIG. 21
See application file for complete search history.

(56) References Cited

U.S. PATENT DOCUMENTS

| 5,539,990 | A | * | 7/1996 | Le ................................... | 33/283 |
| 6,964,106 | B2 | * | 11/2005 | Sergyeyenko et al. .......... | 33/286 |
| 7,146,739 | B2 | * | 12/2006 | Ku et al. ......................... | 33/286 |
| 7,784,192 | B2 | * | 8/2010 | Jancic et al. ..................... | 33/286 |
| 8,056,245 | B2 | * | 11/2011 | Cranton et al. ................. | 33/263 |
| 8,307,562 | B2 | * | 11/2012 | Bascom et al. ................. | 33/286 |
| 2006/0283029 | A1 | * | 12/2006 | Jan et al. ......................... | 33/286 |
| 2008/0276473 | A1 | * | 11/2008 | Raschella et al. ............... | 33/286 |

* cited by examiner

Primary Examiner — Yaritza Guadalupe-McCall
(74) Attorney, Agent, or Firm — Raymond Sun (57) ABSTRACT

A twin-beam laser module has a housing having a first cylindrical space and a second cylindrical space, which are adjacent and parallel in axial direction to each other. A first laser assembly is directly secured inside the first cylindrical space to output a first laser beam, and an outer cylindrical casing is positioned inside the second cylindrical space. A second laser assembly is provided inside the outer cylindrical casing to output a second laser beam, and an adjustment apparatus adjusts the orientation of the outer cylindrical casing so as to align the first laser beam and the second laser beam to be parallel to each other.

16 Claims, 6 Drawing Sheets

TWIN-BEAM LASER MODULE FOR USE WITH A LASER SIGHT

BACKGROUND OF THE INVENTION

1. Field of the Invention

The present invention relates to a laser sight, and in particular to a twin-beam laser module which is lightweight, handy, easy to adjust, and easy to use.

2. Description of the Related Art

In the ever-popular semiconductor laser device industry, the laser beam projected on an object forms a light spot, which is usually used for laser pointers or laser sights. Considering a laser sight that is used with shooting equipment, for example, when aiming, a user first presses his cheeks against the gun butt, and then uses the peep hole and sights to aim at a target. The aim is often hampered by the action of pressing the cheek against the gun butt. When different parts of the cheek are pressed against the gun butt, the angle of the line of sight passing through the peep hole will be affected. Consequently, the impact point would be affected, thereby adversely impacting the accuracy of the aim.

For those guns that require quick aiming, the aim by connecting peep hole and front sight can be troublesome for users. Therefore, a couple of laser sights for assistive quick aiming have been seen in the market. In particular, to prevent shooters from exposing their positions when aiming at night, a laser sight with twin-beam laser has been introduced into the market. The laser sight is integrated with the line of sight formed by peep hole and front sight, and the x-, y-, and z-axis directions of the twin-beam laser are simultaneously adjusted by a control knob so as to quickly assist in aiming.

Figure 1A:
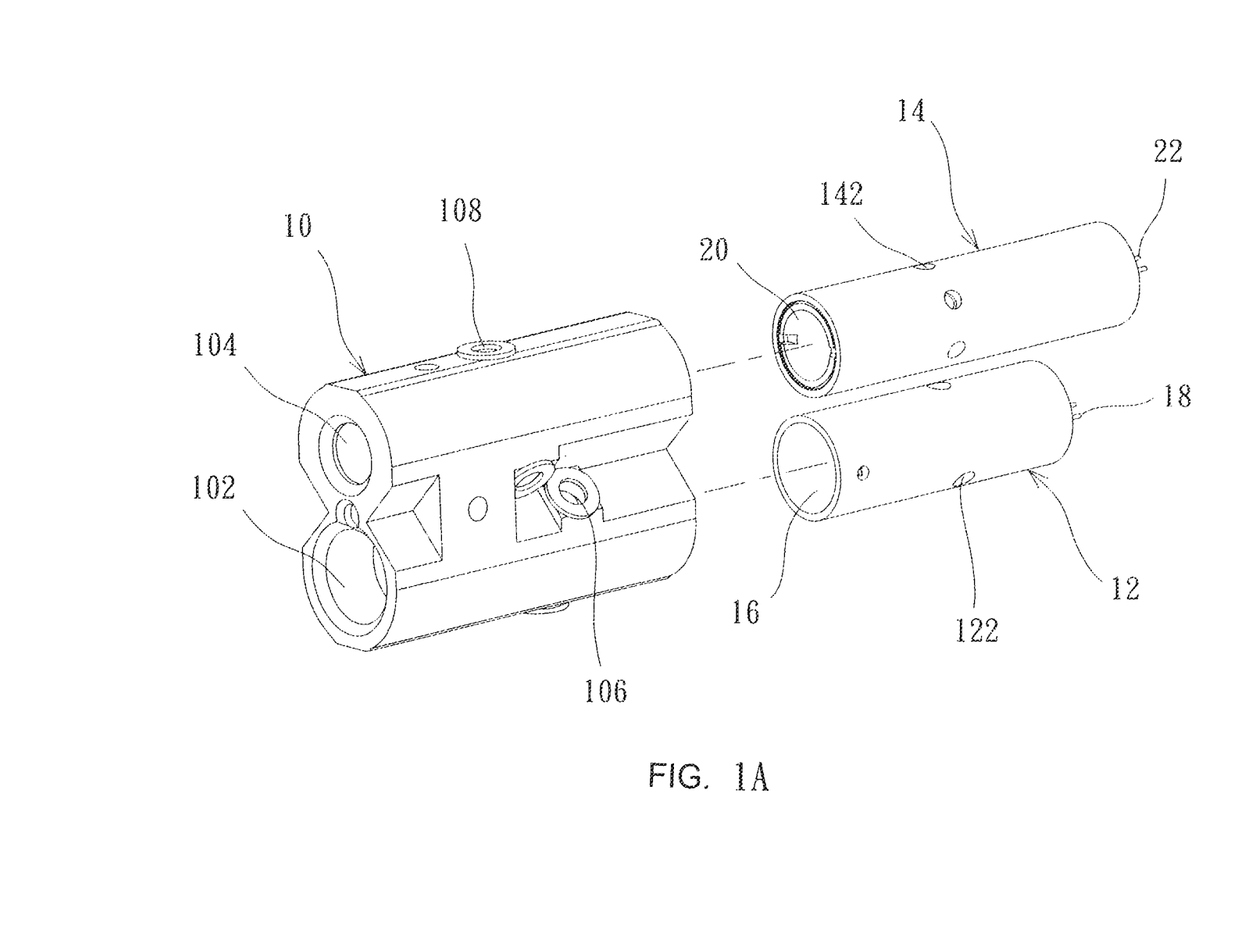
FIG. 1A is a perspective view of a conventional laser sight device.
Figure 1B:
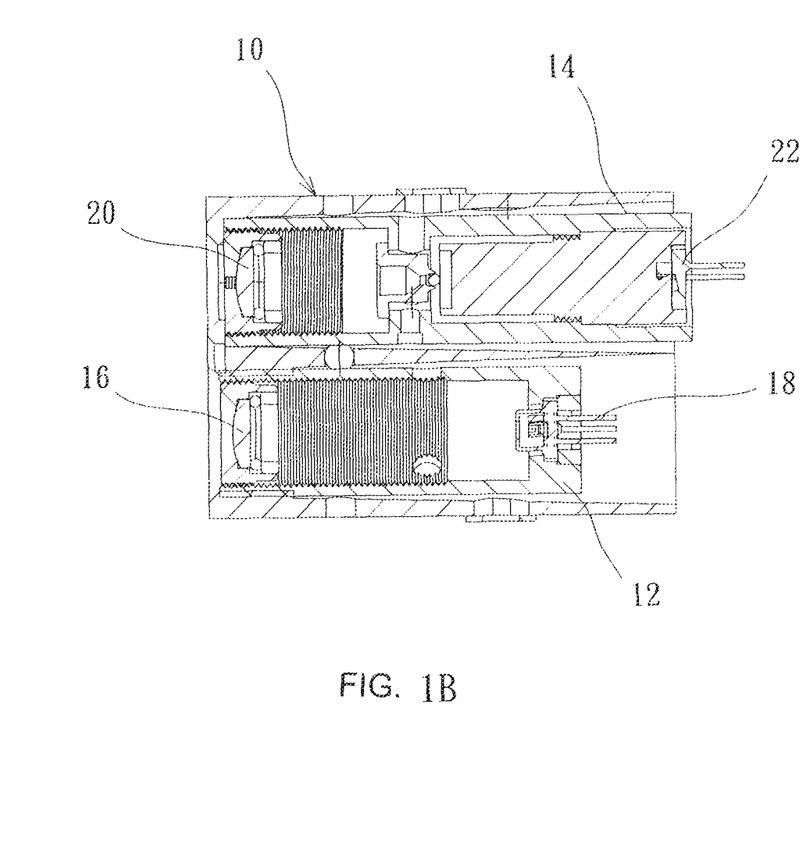
FIG. 1B is a cross-sectional view taken from FIG. 1A.

FIGS. 1A and 1B illustrate a conventional a laser sight with a twin-beam laser module, comprising a housing 10, a first cylindrical body 12, and a second cylindrical body 14. The housing 10 comprises a first accommodating space 102 and a second accommodating space 104, three first screw holes 106 and three second screw holes 108. The first screw holes 106 and the second screw holes 108 are connected through the first accommodating space 102 and second accommodating space 104, respectively. The opposite ends of the first cylindrical body 12 are provided with a first focusing lens assembly 16 and an infrared module 18, respectively. Also, the first cylindrical body 12 is provided with three third screw holes 122, each of which is correspondingly aligned with one of the first screw holes 106. Opposing ends of the second cylindrical body 14 are provided with a second focusing lens assembly 20 and green (or red) laser module 22, respectively. The second cylindrical body 14 is provided with three fourth screw holes 142, each of which is correspondingly aligned with one of the second screw holes 108 to form a continuous channel throughout.

During assembled, the first cylindrical body 12 and the second cylindrical body 14 are mounted into the first and second accommodating spaces 102 and 104, respectively. Further, a plurality of bolts (not shown here) are inserted into the three first screw holes 106, the three second screw holes 108, the three third screw holes 122, and the three fourth screw holes 142. When the apparatus is being adjusted, the bolts described above are used to adjust the axial direction of the first cylindrical body 12, such that the first infrared module 18 emits a first laser beam extending through the first focusing lens assembly 16 to project on to a pre-determined spot. The first laser beam is then used as a reference point, and the bolts described above are then used to adjust the axial direction of the second cylindrical body 14, so that the green (or red) laser module 22 emits a second laser beam extending through the second focusing lens assembly 20 parallel to the first laser beam.

The mechanism described above has a complicated construction. In addition, the first cylindrical body 12 and the second cylindrical body 14 require a very tedious adjustment to align the laser beams to be projected in a parallel manner. Consequently, the calibration of the projected beams is difficult, thereby increasing the production cost. Also, with increasing demand of thin, compact, and portable products, it is important to further simplify the structure and to reduce the volume.

Thus, there still remains a need for a twin-beam laser module for use with laser sights, which overcomes the drawbacks mentioned above.

SUMMARY OF THE INVENTION

The primary object of the present invention is to provide a twin-beam laser module for use with a laser sight, where the laser module has a reduced size, is easy to assemble, and provides a pair of accurate laser beams that can be emitted in parallel.

In order to achieve the objects described above, the present invention provides a twin-beam laser module having a housing having a first cylindrical space and a second cylindrical space, which are adjacent and parallel in axial direction to each other. A first laser assembly is directly secured inside the first cylindrical space to output a first laser beam, and an outer cylindrical casing is positioned inside the second cylindrical space. A second laser assembly is provided inside the outer cylindrical casing to output a second laser beam, and an adjustment apparatus adjusts the orientation of the outer cylindrical casing so as to align the first laser beam and the second laser beam to be parallel to each other.

DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

Figure 2:
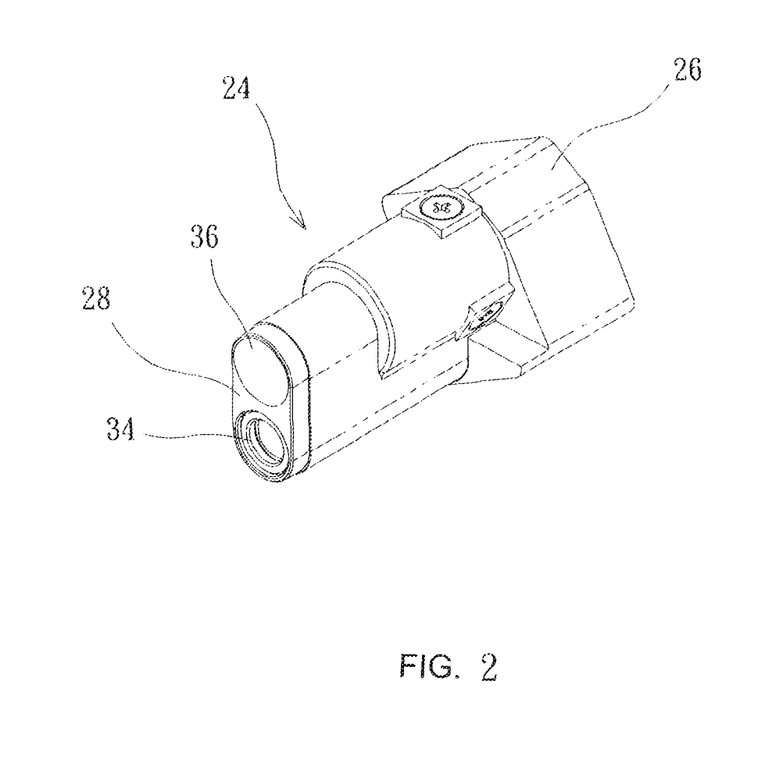
FIG. 2 is a perspective view of a twin-beam laser module according to the present invention.
Figure 3:
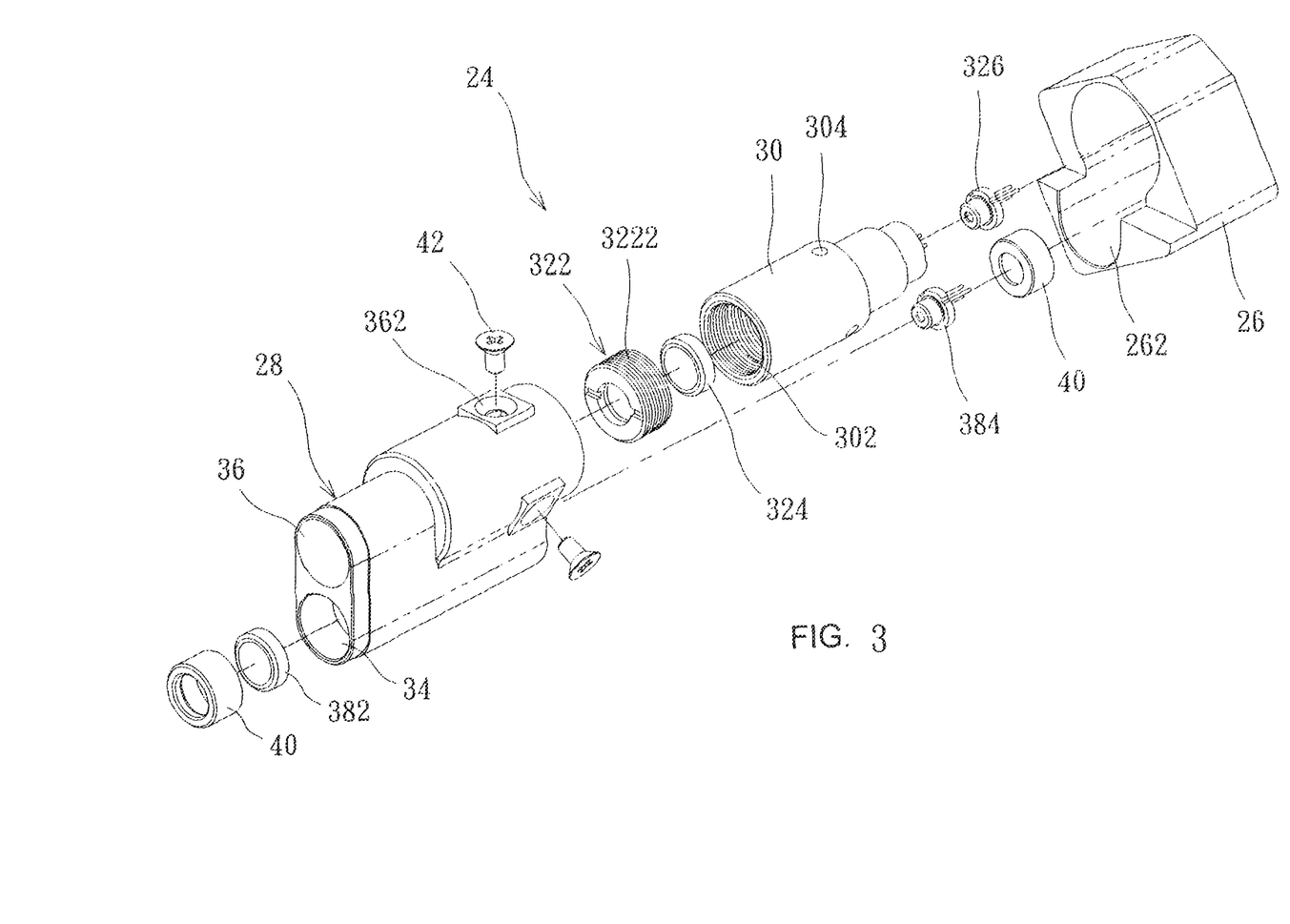
FIG. 3 is an exploded perspective view of the twin-beam laser module of FIG. 2.
Figure 4:
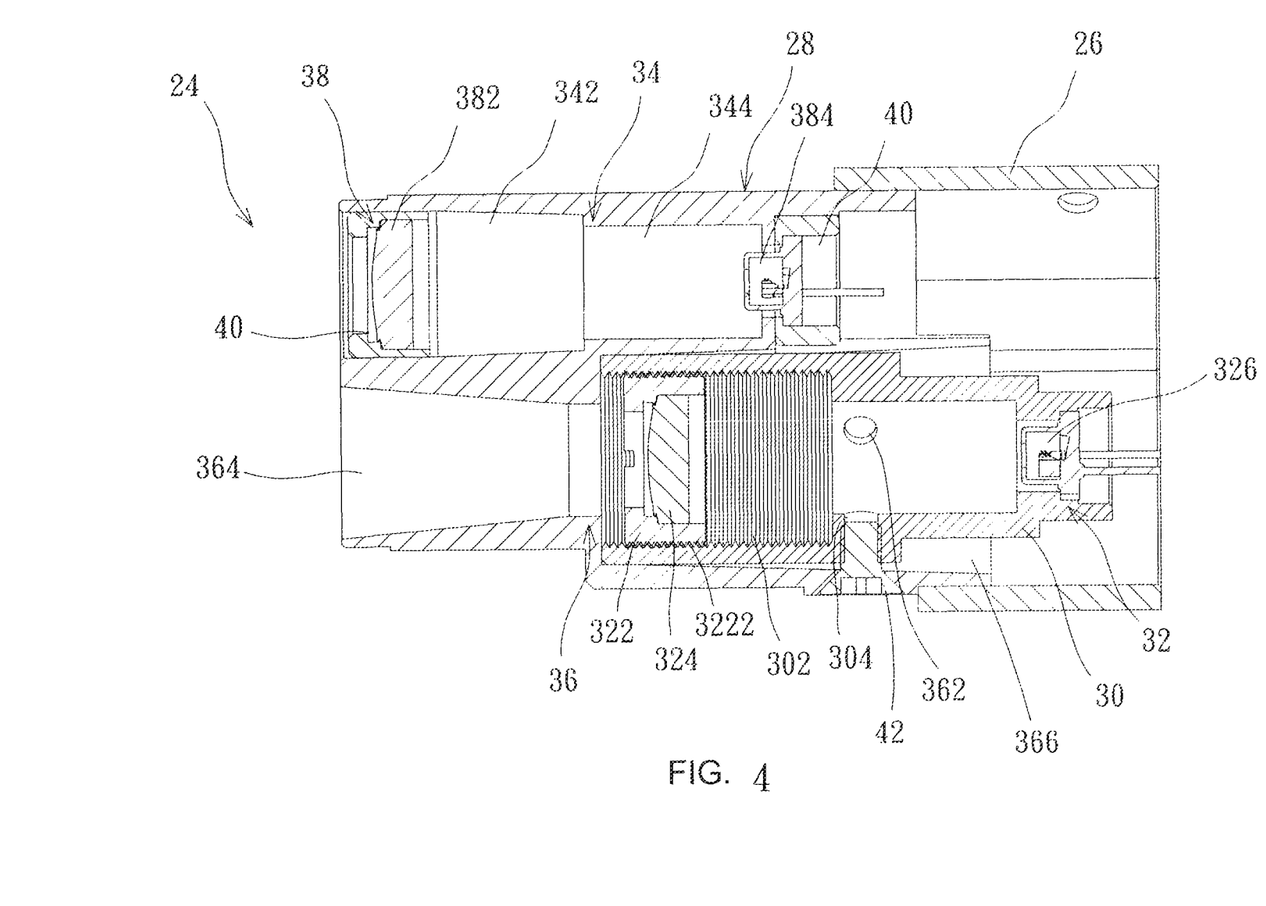
FIG. 4 is a cross-sectional view of the twin-beam laser module of FIG. 2.

Referring together to FIGS. 2, 3, and 4, the present invention is suitable for use with a laser sight to assist in aiming. The present invention provides a twin-beam laser module 24 which includes an adjustment base 26, a housing 28, a first laser assembly 38, an outer cylindrical casing 30, and a second laser assembly 32. The adjustment base 26 is designed and configured such that, when disposed in a laser sight (not shown), it can be arranged coordinately with the accommodating recess and its adjustment apparatus.

The housing 28 is provided with a first cylindrical space 34 and a second cylindrical space 36, which are adjacent to and parallel in axial direction, to each other. The first cylindrical space 34 has a first accommodating zone 342 and a second accommodating zone 344 (see FIG. 4). The diameter of the first accommodating zone 342 is larger than that of the second accommodating zone 344, and the first accommodating zone 342 preferably has a frusto-conical shape. The first laser assembly 38 is directly and securely assembled inside the first cylindrical space 34. The first laser assembly 38 includes a first lens 382 and an infrared device 384. The first lens 382 is disposed in the first accommodating zone 342 and positioned at the front end of the first cylindrical space 34. The first lens 382 can be, for example, a plano-convex lens assembly, and can be directly and securely fixed in the first accommodating zone 342 by a clamp ring 40. The infrared device 384 is positioned towards the rear of the second accommodating zone 344 (i.e., adjacent the rear end of the first cylindrical space 34). A clamp ring 40 is also used to directly and securely fix the infrared device 384 in the second accommodating zone 344. The first laser assembly 38 does not require any additional housing; rather, with the novel design of the housing 28 and the press-fit nature of the clamp rings 40 with the first accommodating zone 342 and the second accommodating zone 344, the first lens 382 and the infrared device 384 can be directly and securely fixed in the first cylindrical space 34.

The second cylindrical space 36 is provided with three first adjustment holes 362 (e.g., screw holes), and also has a third accommodating zone 364 and a fourth accommodating zone 366, which are connected together; the diameter of the third accommodating zone 364 is smaller than that of the fourth accommodating zone 366. The third accommodating zone 364 gradually increases its diameter distally from its connecting position with the fourth accommodating zone 366, forming a frusto-conical accommodating zone. The second cylindrical space 36 is designed to integrate with the structure of the first cylindrical space 34. The largest opening of the first accommodating zone 342, for example, is identical to that of the third accommodating zone 364, but the opening of the fourth accommodating zone 366 is larger than those of the other accommodating zones, in order to accommodate the outer cylindrical casing 30. To reserve a space for the fourth accommodating zone 366 in a limited space environment, the second accommodating zone 344 is therefore smaller than other accommodating zones. Therefore, the overall size of the housing 28 can be minimized by adapting and compensating the designs of the four accommodating zones 342, 344, 364 and 366.

The second laser assembly 32 is assembled as follows. The second laser assembly 32 is disposed inside the outer cylindrical casing 30, and includes a threaded sleeve 322, a second lens 324, and a laser device 326. The second lens 324 is first disposed inside the threaded sleeve 322. The outer perimeter of the threaded sleeve 322 is provided with threads 3222, which can be securely screwed on to the corresponding internal threads 302 of the outer cylindrical casing 30, such that the second lens 324 can be positioned inside the outer cylindrical casing 30. Finally, the laser device 326 is disposed at the end of the outer cylindrical casing 30. The laser device 326 can be securely fixed inside the outer cylindrical casing 30 by press-fitting the laser device 326 into the opening of the outer cylindrical casing 30.

The outer cylindrical casing 30 is provided with three second adjustment holes 304, which correspond to, and are aligned with, the three first adjustment holes 362 of the housing 28. The outer cylindrical casing 30 (with the second laser assembly 32 disposed therein) is then positioned inside the second cylindrical space 36 of the housing 28. The adjustment base 26 is provided with a through-hole 262, which is sized and configured to match the exterior of the housing 28. Consequently, the housing 28 can be press-fit into the through-holes 262 and securely fixed onto the adjustment base 26. Alternately, the adjustment base 26 can be glued to the housing 28.

This construction and assembly procedure provides a laser module 24 that is simple, and which allows for size of the laser module 24 to be reduced. In contrast, conventional laser modules typically provide for two separate outer cylindrical casings to house the two laser assemblies, respectively, and then the two casings are secured together inside a larger housing. However, the present invention requires only one outer cylindrical casing to accommodate both laser assemblies, thereby reducing the overall size of the laser module 24.

The parallel laser beams can be adjusted as follows. First, the first laser assembly 38 is directly positioned inside the first cylindrical space 34 of the housing 28, so there is no need to adjust the laser beams from the first laser assembly 38. Consequently, the infrared device 384 of the first laser assembly 38 is operated to output the first laser light, which is an invisible light. The first laser beam passes through the openings of the second accommodating zone 344, the first accommodating zone 342, and the first lens 382 for condensing before projecting outwardly. The first laser beam of the infrared device 384 can be used as the reference point for projection.

Three adjustment pieces 42 (e.g., screws) are inserted into corresponding and aligned first adjustment holes 362 and second adjustment holes 304, and then the laser device 326 of the second laser assembly 32 is adjusted to output a second laser beam. The laser device 326 can be a red light laser device, or a green light laser device, and therefore is a visible light source. The second laser beam passes through the bore of the outer cylindrical casing 30 and is condensed at the second lens 324 before finally projecting outwardly from the third accommodating zone 364. After the assembly process, the second laser beam from the second laser assembly 32 and the first laser beam from the first laser assembly 38 may not be exactly parallel to each other. The three adjustment pieces 42 can be used to fine-tune the axial displacements of x-, y-, and z-directions of the outer cylindrical casing 30, such that the second laser beam from the second laser assembly 32 can be exactly parallel to the first laser beam from the first laser assembly 38. The first laser beam and the second laser beam are therefore projected in parallel when in regular use. Finally, after the first laser beam and the second laser beam are confirmed to be projected in parallel, the calibration procedure is completed and the outer cylindrical casing 30 is securely glued inside the fourth accommodating zone 366. Therefore, the built-in first laser assembly 38 positioned in the two-in-one housing 28 is used as the reference point of laser beam; when the second laser assembly 32 is being installed, it is only necessary to adjust the second laser beam from the second laser assembly 32 to be parallel to the first laser beam from the first laser assembly 38. Consequently, the tedious adjustment process to obtain parallel laser beams in conventional laser modules can be simplified, and the step of adjusting the invisible laser beam can also be omitted, thereby leading to a reduction in production cost.

Furthermore, the twin-beam laser module with visible and invisible light according to the present invention is suitable for use as an assistive sighting device in all weather conditions, is able to enhance the stability and accuracy of operation.

Figure 5:
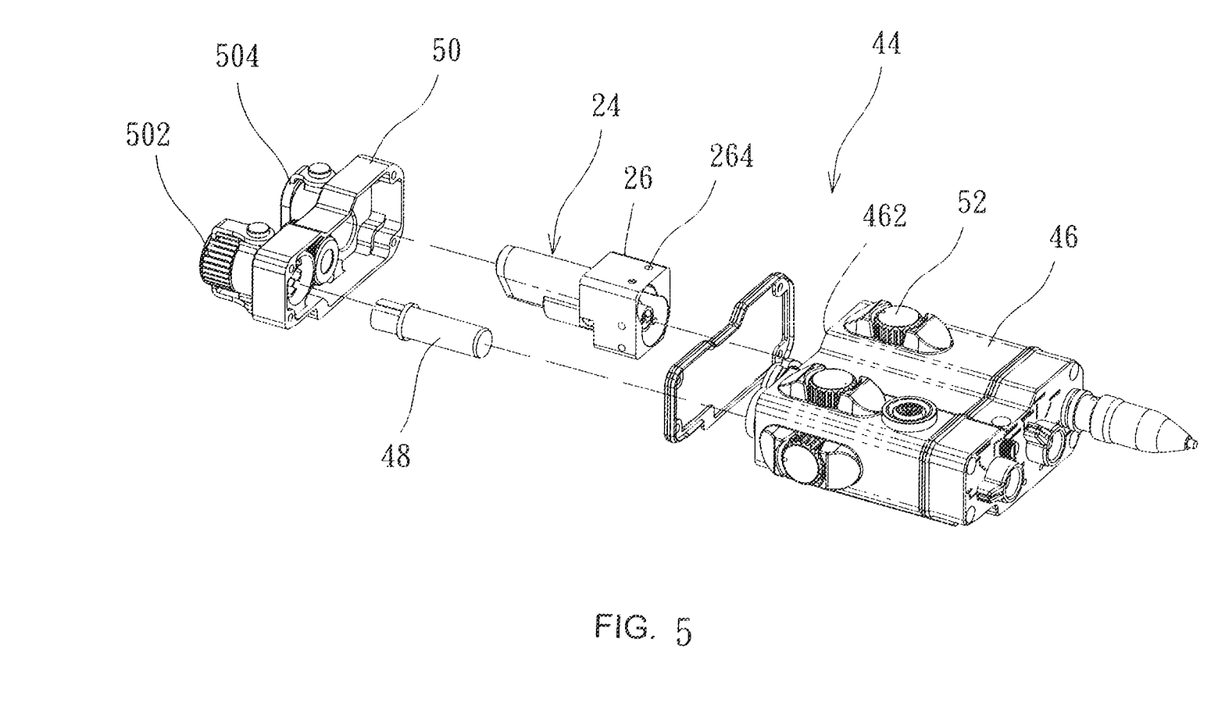
FIG. 5 is a schematic illustration of the present invention applied in a three-in-one laser sight.

Referring to FIG. 5, the principles of the present invention are applied in a three-in-one laser sight, whose schematic view in show in FIG. 5. The twin-beam leaser module 24 is assembled in a three-in-one laser sight 44. The laser sight 44 includes a laser sight body 46, a laser beam lighting module 48, and a front cover 50, where the twin-beam laser module 24 is adjacent to, and is parallel to, the laser beam lighting module 48. The front cover 50 is provided with a focus tuning knob 502 and a lens cover set 504, which correspond to the laser beam lighting module 48 and the twin-beam laser module 24, respectively. The focus tuning knob 502 can be used to adjust the distance of lighting for the laser beam lighting module 48, such that it is suitable for use as lighting for night vision goggles. The lens cover set 504 is used in unison with the laser module 24. The laser sight body 46 has a laser module accommodating recess 462 and a plurality of adjustment knobs 52. The adjustment base 26 of the laser module 24 is also provided with at least two third adjustment holes 264. The adjustment base 26 of the laser module 24 is first installed into the laser module accommodating recess 462 in a way that the two third adjustment holes 264 are aligned with the plurality of adjustment knobs 52, such that the adjustment base 26 is controlled by the plurality of adjustment knobs 52 to adjust the axial directions of the adjustment base 26. For example, the present invention can be incorporated with the aiming point of the peep-and-sight of a gun. The plurality of adjustment knobs 52 are used to adjust the displacements of x-, y-, and z-axis directions of the laser module 24 according to the present invention, such that the laser beam spot can be adjusted to be coincide with the aiming point. Consequently, the present invention can effectively assist in aiming, and thus the target can be accurately aimed at.

While the description above refers to particular embodiments of the present invention, it will be understood that many modifications may be made without departing from the spirit thereof.

What is claimed is:

1. A twin-beam laser module, comprising
   a housing having a first cylindrical space and a second cylindrical space, which are adjacent and parallel in axial direction to each other;
   a first laser assembly directly secured inside the first cylindrical space to output a first laser beam;
   an outer cylindrical casing positioned inside the second cylindrical space;
   a second laser assembly provided inside the outer cylindrical casing to output a second laser beam, and including a second lens, and with a laser device disposed at a rear end of the outer cylindrical casing and outputting the second laser beam; and
   an adjustment apparatus that adjusts the orientation of the outer cylindrical casing so as to align the first laser beam and the second laser beam to be parallel to each other, wherein the second cylindrical space of the housing has a plurality of first adjustment holes and the outer cylindrical casino has a plurality of second adjustment holes which correspond to and are aligned with the plurality of first adjustment holes, wherein the adjustment apparatus includes a plurality of adjustment pieces, each of which is inserted into one aligned set of first adjustment hole and second adjustment hole to adjust the axial displacements of x-, y-, and z-directions of the second laser assembly, thereby adjusting the second laser beam so that the second laser beam is projected in parallel with the first laser beam.

2. The twin-beam laser module of claim 1, wherein the first laser assembly further comprises:
   a first lens disposed at a front end of the first cylindrical space; and
   an infrared device disposed at a rear end of the first cylindrical space.

3. The twin-beam laser module of claim 2, wherein the first cylindrical space comprises a first accommodating zone and a second accommodating zone which are connected to form a continuous channel throughout, with the diameter of the first accommodating zone larger than that of the second accommodating zone; wherein the first lens is disposed in the first accommodating zone; and the infrared device is disposed in the second accommodating zone.

4. The twin-beam laser module of claim 1, wherein the second laser assembly comprises:
   a threaded sleeve whose outer perimeter is disposed with threads, and wherein the outer cylindrical casing has inner threads that engage the threads of the threaded sleeve so that the threaded sleeve can be fixedly screwed therein.

5. The twin-beam laser module of claim 4, wherein the laser device is a red or green laser device.

6. A twin-beam laser module, comprising
   a housing having a first cylindrical space and a second cylindrical space, which are adjacent and parallel in axial direction to each other;
   a first laser assembly directly secured inside the first cylindrical space to output a first laser beam;
   an outer cylindrical casing positioned inside the second cylindrical space;
   a second laser assembly provided inside the outer cylindrical casing to output a second laser beam, and including a second lens, and with a laser device disposed at a rear end of the outer cylindrical casing and outputting the second laser beam; and
   an adjustment apparatus that adjusts the orientation of the outer cylindrical casing so as to align the first laser beam and the second laser beam to be parallel to each other, wherein the second cylindrical space comprises a third accommodating zone and a fourth accommodating zone, and the diameter of the third accommodating zone is smaller than that of the fourth accommodating zone, with the outer cylindrical casing disposed inside the fourth accommodating zone; and wherein the second laser beam from the second laser assembly passes in sequence through the threaded sleeve, the second lens, and the third accommodating zone before projecting outwardly.

7. The twin-beam laser module of claim 6, wherein the third accommodating zone has a frusto-conical configuration.

8. The twin-beam laser module of claim 6, wherein the outer cylindrical casing is securely glued inside the fourth accommodating zone.

9. A laser sight, comprising:
   a laser sight body having a laser module accommodating recess and a plurality of adjustment knobs;
   an adjustment base provided inside the laser module accommodating recess and controlled by the plurality of adjustment knobs to adjust the axial displacements of the adjustment base;

a housing disposed inside the adjustment base and provided with a first cylindrical space and a second cylindrical space which are adjacent and parallel in axial direction to each other;

a first laser assembly directly secured inside the first cylindrical space to output a first laser beam;

an outer cylindrical casing positioned inside the second cylindrical space;

a second laser assembly provided inside the outer cylindrical casing to output a second laser beam, and including a second lens, and with a laser device disposed at a rear end of the outer cylindrical casing and outputting the second laser beam; and an adjustment apparatus that adjusts the orientation of the outer cylindrical casing so as to align the first laser beam and the second laser beam to be parallel to each other, wherein the second cylindrical space of the housing has a plurality of first adjustment holes and the outer cylindrical casing has a plurality of second adjustment holes which correspond to and are aligned with the three first adjustment holes, wherein the adjustment apparatus includes a plurality of adjustment pieces, each of which is inserted into one aligned set of first adjustment hole and second adjustment hole to adjust the axial displacements of x-, y-, and z-directions of the second laser assembly, thereby adjusting the second laser beam so that the second laser beam is projected in parallel with the first laser beam.

10. The laser sight of claim 9, wherein the first laser assembly comprises:

a first lens disposed at the front end of the first cylindrical space; and an infrared device disposed at the rear end of the first cylindrical space.

11. The laser sight of claim 10, wherein the first cylindrical space comprises a first accommodating zone and a second accommodating zone which are connected to form a continuous channel throughout, with the diameter of the first accommodating zone larger than that of the second accommodating zone; wherein the first lens is disposed in the first accommodating zone; and the infrared device is disposed in the second accommodating zone.

12. The laser sight of claim 9, wherein the second laser assembly comprises:

a threaded sleeve whose outer perimeter is disposed with threads, and wherein the outer cylindrical casing has inner threads that engage the threads of the threaded sleeve so that the threaded sleeve can be fixedly screwed therein.

13. The laser sight of claim 12, wherein the laser device is a red or green laser device.

14. The laser sight of claim 9, wherein the second cylindrical space comprises a third accommodating zone and a fourth accommodating zone, and the diameter of the third accommodating zone is smaller than that of the fourth accommodating zone, with the outer cylindrical casing disposed inside the fourth accommodating zone; and wherein the second laser beam from the second laser assembly passes in sequence through the threaded sleeve, the second lens, and the third accommodating zone before projecting outwardly.

15. The laser sight of claim 14, wherein the third accommodating zone has a frusto-conical configuration.

16. The laser sight of claim 14, wherein the outer cylindrical casing is securely glued inside the fourth accommodating zone.

* * * * *